(12) United States Patent
Lamesch et al.

(10) Patent No.: US 10,795,021 B2
(45) Date of Patent: Oct. 6, 2020

(54) DISTANCE DETERMINATION METHOD

(71) Applicant: IEE International Electronics & Engineering S.A., Echternach (LU)

(72) Inventors: Laurent Lamesch, Reichlange (LU); Bruno Mirbach, Konz (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 51 days.

(21) Appl. No.: 14/778,918

(22) PCT Filed: Mar. 14, 2014

(86) PCT No.: PCT/EP2014/055068
§ 371 (c)(1),
(2) Date: Sep. 21, 2015

(87) PCT Pub. No.: WO2014/146978
PCT Pub. Date: Sep. 25, 2014

(65) Prior Publication Data
US 2016/0047913 A1   Feb. 18, 2016

(30) Foreign Application Priority Data

Mar. 20, 2013 (LU) .......................................... 92173

(51) Int. Cl.
*G01B 5/02* (2006.01)
*G01B 5/14* (2006.01)
(Continued)

(52) U.S. Cl.
CPC ............ *G01S 17/36* (2013.01); *G01S 7/4915* (2013.01); *G01S 17/89* (2013.01); *G01C 15/002* (2013.01); *G01S 17/894* (2020.01)

(58) Field of Classification Search
None
See application file for complete search history.

(56) References Cited

U.S. PATENT DOCUMENTS 6,288,776 B1 * 9/2001 Cahill .................... G01B 11/24
356/496
7,471,376 B2 * 12/2008 Bamji ...................... G01C 3/08
356/5.01
(Continued)

FOREIGN PATENT DOCUMENTS

CA    2397095 A1 *  7/2001   ......... G01B 11/2509
CN    1466812 A       1/2004
(Continued)

OTHER PUBLICATIONS

Electric Power Group v. Alstom (See Attached Case).*
(Continued)

*Primary Examiner* — Alexander Satanovsky
*Assistant Examiner* — Leonard S Liang
(74) *Attorney, Agent, or Firm* — Reising Ethington P.C.

(57) ABSTRACT

A method for determining a distance comprises: providing at least two phase measurements made with modulated light of different modulation wavelengths, each phase measurement being indicative of the distance up to an integer multiple of a respective modulation wavelength; providing a set of possible wraparound count combinations; for each one of the possible wraparound count combinations, calculating a combination of unwrapped phase hypotheses corresponding to the at least two phase measurements; and selecting a most plausible combination of unwrapped phase hypotheses among the combinations of unwrapped phase hypotheses and calculating the distance based upon the selected most plausible combination of unwrapped phase hypotheses.

9 Claims, 6 Drawing Sheets

(51) Int. Cl.
*G01B 7/02* (2006.01)
*G01B 7/14* (2006.01)
*G01B 11/02* (2006.01)
*G01B 11/14* (2006.01)
*G01B 13/02* (2006.01)
*G01B 21/02* (2006.01)
*G01C 22/00* (2006.01)
*G01S 17/36* (2006.01)
*G01S 7/491* (2020.01)
*G01S 17/89* (2020.01)
*G01S 7/4915* (2020.01)
*G01C 15/00* (2006.01)
*G01S 17/894* (2020.01)

(56) References Cited

U.S. PATENT DOCUMENTS

| | | | | |
|---|---|---|---|---|
| 7,719,662 B2* | 5/2010 | Bamji | ............ | G01C 3/08 356/3.1 |
| 7,791,715 B1* | 9/2010 | Bamji | ............ | G01C 3/08 356/4.01 |
| 7,936,449 B1* | 5/2011 | Bamji | ............ | G01C 3/08 356/3.01 |
| 8,010,316 B2* | 8/2011 | Maltseff | ............ | G01S 17/36 356/5.05 |
| 8,184,268 B2* | 5/2012 | Seeger | ............ | G01S 13/38 356/5.01 |
| 8,209,146 B2* | 6/2012 | Maltseff | ............ | G01S 17/36 356/5.01 |
| 8,629,976 B2* | 1/2014 | Hui | ............ | G01S 17/894 356/4.01 |
| 8,648,702 B2 | 2/2014 | Pala | | |
| 8,723,924 B2* | 5/2014 | Mirbach | ............ | G01S 17/36 348/46 |
| 8,970,827 B2* | 3/2015 | Bloom | ............ | G02B 26/0841 356/5.01 |
| 9,030,670 B2* | 5/2015 | Warden | ............ | G01B 9/02004 356/498 |
| 9,488,722 B2* | 11/2016 | Waligorski | ............ | G01S 7/4915 |
| 9,538,109 B2* | 1/2017 | Forster | ............ | G01S 17/89 |
| 9,542,749 B2* | 1/2017 | Freedman | ............ | G01S 17/36 |
| 9,602,807 B2* | 3/2017 | Crane | ............ | G01S 17/89 |
| 9,702,976 B2* | 7/2017 | Xu | ............ | G01S 17/32 |
| 9,753,128 B2* | 9/2017 | Schweizer | ............ | G01S 7/4912 |
| 9,864,048 B2* | 1/2018 | Hall | ............ | G01S 17/89 |
| 9,897,699 B2* | 2/2018 | Kadambi | ............ | G01S 17/89 |
| 10,024,966 B2* | 7/2018 | Patil | ............ | G01S 17/89 |
| 10,190,983 B2* | 1/2019 | Bhandari | ............ | G07D 7/00 |
| 10,571,571 B2* | 2/2020 | Ko | ............ | G01S 17/36 |
| 10,598,783 B2* | 3/2020 | Perry | ............ | G01S 17/89 |
| 2002/0135775 A1* | 9/2002 | De Groot | ............ | G01B 11/0608 356/497 |
| 2002/0159539 A1* | 10/2002 | Alcock | ............ | H04L 27/2332 375/279 |
| 2004/0027585 A1* | 2/2004 | Groot | ............ | G01B 11/0608 356/511 |
| 2004/0100626 A1 | 5/2004 | Gulden et al. | | |
| 2004/0196177 A1* | 10/2004 | Billington | ............ | G01S 7/4004 342/174 |
| 2006/0061772 A1* | 3/2006 | Kulawiec | ............ | G01B 9/02004 356/511 |
| 2007/0127009 A1* | 6/2007 | Chen | ............ | G01S 7/497 356/5.1 |
| 2008/0007709 A1* | 1/2008 | Bamji | ............ | G01C 3/08 356/5.01 |
| 2009/0185159 A1* | 7/2009 | Rohner | ............ | G01S 7/4865 356/5.01 |
| 2009/0219195 A1* | 9/2009 | Brandwood | ............ | H01Q 3/267 342/174 |
| 2009/0322859 A1* | 12/2009 | Shelton | ............ | G01B 11/2513 348/46 |
| 2010/0046802 A1* | 2/2010 | Watanabe | ............ | G06T 7/564 382/106 |
| 2010/0265489 A1* | 10/2010 | Seeger | ............ | G01S 13/38 356/5.1 |
| 2011/0018967 A1* | 1/2011 | Mirbach | ............ | G01S 7/497 348/46 |
| 2011/0188028 A1* | 8/2011 | Hui | ............ | G01S 17/894 356/5.01 |
| 2011/0260911 A1* | 10/2011 | Sapp | ............ | G01S 3/10 342/156 |
| 2011/0292370 A1* | 12/2011 | Hills | ............ | G01S 7/4912 356/5.01 |
| 2011/0304841 A1* | 12/2011 | Bamji | ............ | G01S 7/4914 356/5.01 |
| 2012/0008128 A1* | 1/2012 | Bamji | ............ | G01S 17/894 356/5.01 |
| 2012/0013887 A1* | 1/2012 | Xu | ............ | G01S 7/497 356/4.02 |
| 2012/0044093 A1* | 2/2012 | Pala | ............ | G01S 17/86 340/963 |
| 2012/0098935 A1* | 4/2012 | Schmidt | ............ | G01S 17/89 348/46 |
| 2012/0121165 A1* | 5/2012 | Ko | ............ | G01S 17/894 382/154 |
| 2012/0123718 A1* | 5/2012 | Ko | ............ | G01S 17/89 702/85 |
| 2012/0176476 A1* | 7/2012 | Schmidt | ............ | G01S 17/89 348/46 |
| 2013/0101176 A1* | 4/2013 | Park | ............ | G01S 17/36 382/106 |
| 2013/0222550 A1* | 8/2013 | Choi | ............ | H04N 13/257 348/47 |
| 2013/0228691 A1* | 9/2013 | Shah | ............ | G01S 17/89 250/341.8 |
| 2014/0049767 A1* | 2/2014 | Benedetti | ............ | G01S 17/89 356/5.1 |
| 2014/0211193 A1* | 7/2014 | Bloom | ............ | G02B 26/0841 356/5.01 |
| 2014/0300700 A1* | 10/2014 | Bamji | ............ | G01S 7/4863 348/46 |
| 2014/0313376 A1* | 10/2014 | Van Nieuwenhove | ............ | G01S 17/89 348/241 |
| 2015/0062558 A1* | 3/2015 | Koppal | ............ | G01S 17/89 356/5.01 |
| 2015/0120241 A1* | 4/2015 | Kadambi | ............ | G01S 17/32 702/166 |
| 2015/0124242 A1* | 5/2015 | Pierce | ............ | A01D 34/008 356/5.01 |
| 2015/0193938 A1* | 7/2015 | Freedman | ............ | G01S 17/36 382/154 |
| 2016/0116594 A1* | 4/2016 | Xu | ............ | G01S 17/32 356/5.1 |
| 2016/0334508 A1* | 11/2016 | Hall | ............ | G01S 7/4915 |
| 2017/0016981 A1* | 1/2017 | Hinderling | ............ | G01S 17/42 |
| 2017/0212228 A1* | 7/2017 | Van Nieuwenhove | ............ | G01S 17/89 |
| 2018/0011195 A1* | 1/2018 | Perry | ............ | G01S 17/89 |

FOREIGN PATENT DOCUMENTS

| | | | | |
|---|---|---|---|---|
| CN | 101449181 A | * | 6/2009 | ............ G01S 7/487 |
| CN | 102253392 A | * | 11/2011 | ............ G01B 11/22 |
| CN | 102445688 A | | 5/2012 | |
| CN | 102667521 A | | 9/2012 | |
| DE | 10039422 A1 | | 2/2002 | |
| FR | 2966933 A1 | * | 5/2012 | ............ G01S 7/36 |
| JP | 2017032342 A | * | 2/2017 | ............ G01C 3/06 |
| KR | 20150007192 A | * | 1/2015 | ............ G01C 3/08 |
| WO | WO-9810255 A1 | * | 3/1998 | ............ G01J 9/00 |
| WO | WO2011076907 A1 | | 6/2011 | |
| WO | WO-2013104717 A1 | * | 7/2013 | ............ G01S 17/894 |

OTHER PUBLICATIONS

Machine Translation for FR2966933 (Year: 2012).*
Machine Translation for JP2017032342 (Year: 2017).*
Machine Translation for CN101449181 (Year: 2009).*

(56) References Cited

OTHER PUBLICATIONS

Machine Translation for CN102253392 (Year: 2011).*
Machine Translation for KR20150007192 (Year: 2015).*
Fuchs, "Multipath Interference Compensation in Time-of-Flight Camera Images"; 2010 (https://www.robotic.de/fileadmin/robotic/fuchs/MPICornpensationICPR2010.pdf) (Year: 2010).*
May et al, "Three-Dimensional Mapping with Time-of-Flight Cameras"; Journal of Field Robotics 26(11-12), 934-965 (2009). (Year: 2009).*
Chinese Office Action, in Chinese with English translation, corresponding to CN application No. 201480016730.9, dated Apr. 26, 2016, 11 pages.
D. Droeschel et al. "Multi-frequency Phase Unwrapping for Time-of-Flight cameras", Intelligent Robots and Systems (IROS), 2010 IEEE/RSJ International Conference; Oct. 18, 2010; pp. 1463-1469.
A. A. Dorrington et al. "Archieving sub-millimetre precision with a solid-state full-field heterodyning range imaging camera; sub-millimetre precision with a heterodyning range imaging camera" Measurement Science and Technology, vol. 18, No. 9, Jul. 20, 2007; pp. 2809-2816.
International Search Report and Written Opinion dated May 20, 2014 re: Application No. PCT/EP2014/055068; pp. 1-12.
Andrew D. Payne et al. "Multiple frequency range imaging to remove measurement ambiguity", 9th conference on Optical 3-D Measurement Techniques, Jul. 1-3, 2009, pp. 139-148 XP002660844.

\* cited by examiner

DISTANCE DETERMINATION METHOD

TECHNICAL FIELD

The present invention generally relates to a method for determining a distance based upon a plurality of phase measurements, made at different wavelengths, each of the phase measurements, taken individually, being ambiguous in the sense that it indicates the distance only up to an integer multiple of the respective wavelength.

BACKGROUND ART

Distance measuring equipment often relies on the time-of-flight (TOF) measurement principle. Distance (also: depth) information is in this case obtained by emitting modulated light into the direction of the target and measuring the phase shift of the modulation between the emitted and the reflected light. The measured phase is proportional to the distance between the measurement equipment and the target, modulo the wavelength of the modulation. This relationship may be expressed as:

$$\varphi = \mod\left(\frac{d \cdot 4\pi \cdot f}{c}, 2\pi\right),$$

where $\varphi$ is the modulation phase in radians, d is the distance, f is the modulation frequency, and c is the speed of light. The modulation wavelength $\lambda$ is given as $\lambda = c/f$. The extra factor 2 ($4\pi$ instead of $2\pi$) in the first argument of the mod function is due to the fact that the light travels twice the distance between the distance measuring equipment and the target. The above relationship expresses that the phase measurement is ambiguous, i.e. the distance value d' calculated as $d' = \varphi \cdot c/(4\pi \cdot f)$ may be different from the actual distance by an a priori unknown integer number of modulation wavelengths.

The distance $d_u = c/(2 \cdot f)$ is called the "unambiguity range", because if it is known beforehand that the measured distance is less than $d_u$, the modulo function may be inverted, yielding an unambiguous distance. However, if the target may be located at greater distances from the target than $d_u$, any phase measurement will be comprised in the interval [0, $2\pi$[: one says that the measurements are "wrapped" into the unambiguity range. As a consequence, retrieving the actual distance from the ambiguous measurement, or, otherwise stated, determining the integer number of modulation wavelengths to add to the distance value d' in order to arrive at the actual distance, is called "phase unwrapping".

In a single-frequency system, the usable distance measurement range is bounded by the unambiguity range unless assumptions are made on the smoothness of the scene (neighbouring pixels) and on the smoothness of the evolution in time of a distance measurement. Such assumptions cannot be made in all circumstances and for all applications. Specifically, in an adaptive driver assistance system, such assumptions are normally not permitted. When operating a 3D TOF camera or other distance measuring equipment, the usable unambiguity range may not be sufficient when employing a single modulation frequency. To overcome that drawback, n (n>1) measurements of the same distance may be made with n different modulation frequencies. The usable distance measurement range can thereby be extended by combining the results of the different measurements and finding, or estimating (in the case of presence of measurement noise), the unknown distance by trying to invert the modulo function. When using two frequencies (n=2), the combination is easily performed by calculating the difference between the measured phases at the first and second modulation frequency, but when using three frequencies or more in order to further reduce the measurement error in presence of noise compared to using only two frequencies, a method which is as simple as calculating the phase difference does not exist.

The paper "Multi-frequency Phase Unwrapping for Time-of-Flight Cameras", D. Droeschel, D. Holz and S. Behnke, Proceedings of IEEE/RSJ International Conference on Intelligent Robots and Systems (IROS), Taipei, Taiwan, October 2010, discloses a probabilistic phase unwrapping approach, which takes into account the neighborhood of each pixel. The paper also mentions the possibility of using two modulation frequencies for detecting phase wrapping. It is proposed to compare the two distance values obtained from the two measured phases. If these distance values coincide, the distance lies in the unambiguity range; if they do not coincide, at least one of the phases has been wrapped into the [0,$2\pi$[ interval and the phase has to be unwrapped.

Document DE 100 39 422 C2 discloses a photoelectronic mixing device (PMD) operating at plural frequencies for carrying out measurements of speed and/or distance.

U.S. Pat. No. 7,791,715 B1 relates to a method and system for dealiasing (unwrapping) in TOF systems. The system uses at least two close-together modulation frequencies $f_1$ and $f_2$ that are close to the maximum modulation frequency supported by the system. The distance Z is then calculated as:

$$Z = \frac{c \cdot \Delta\varphi}{4\pi \cdot \Delta f},$$

where $\Delta\varphi$ is the difference of the measured phases at $f_1$ and $f_2$, respectively, and where $\Delta f = f_1 - f_2$. When more than two different frequencies are available, the phase measurements are combined in pairs and the same formula is applied.

Whereas it is known from the prior art to combine plural frequencies in order to achieve a greater (combined) unambiguity range, the known methods have drawbacks when measurement noise comes into play. Furthermore, the computational effort necessary to carry these methods out may be too important for low-cost implementations.

BRIEF SUMMARY

A practically implementable method is provided herein for estimating the unknown distance when using two or more modulation frequencies.

According to the invention, a method for determining a distance comprises
  providing at least two phase measurements made with modulated light of different modulation wavelengths, each phase measurement being indicative of the distance up to an integer multiple of a respective modulation wavelength;
  providing a set of possible wraparound count combinations;
  for each one of the possible wraparound count combinations, determining a combination of unwrapped phase hypotheses corresponding to the at least two phase measurements; and selecting a most plausible combination of unwrapped phase hypotheses among the combinations of unwrapped phase hypotheses and determining the distance based upon the selected most plausible combination of unwrapped phase hypotheses.

The distance may e.g. be determined, for example by calculating as an average over the distance values associated with the unwrapped phase hypotheses of the most plausible combination of unwrapped phase hypotheses.

According to preferred possible embodiment the selecting of the most plausible combination of unwrapped phase hypotheses among the combinations of unwrapped phase hypotheses comprises for each combination of unwrapped phase hypotheses, calculating a combination of distance values associated with the unwrapped phase hypotheses of the respective combination of unwrapped phase hypotheses, for each combination of unwrapped phase hypotheses, calculating a variance or standard deviation of the respective combination of distance values, and selecting as the most plausible combination of unwrapped phase hypotheses the one for which the variance or standard deviation is smallest.

According to a preferred embodiment of the invention, the selecting of the most plausible combination of unwrapped phase hypotheses among the combinations of unwrapped phase hypotheses comprises for each combination of unwrapped phase hypotheses, calculating a gap between a point having the respective unwrapped phase hypotheses as coordinates and an origin-crossing straight line having a direction vector with coordinate representation $[1/\lambda_1, \ldots, 1/\lambda_n]$, where $\lambda_1, \ldots, \lambda_n$ designate the different modulation wavelengths, and selecting as the most plausible combination of unwrapped phase hypotheses the one for which the gap is smallest.

The distance may advantageously be calculated as $$\frac{\|\vec{\varphi}'_{est}\| \cdot c}{4\pi \cdot \|\vec{u}\|},$$

where $\vec{\varphi}'_{est}$ is an orthogonal projection onto the origin-crossing straight line of a point having the most plausible combination of unwrapped phase hypotheses as coordinates, and $\vec{u}$ is the direction vector $[c/\lambda_1, \ldots, c/\lambda_n]$.

Yet more advantageously, the calculating of the gap may be carried out in a rotated coordinate system, in which the origin-crossing straight line is a coordinate axis. In this case, the distance is preferably calculated as calculated as $$\frac{(\vec{\varphi}''_{j\_opt})_1 \cdot c}{4\pi \cdot \|\vec{u}\|}$$

where $(\vec{\varphi}''_{j\_opt})_1$ is a coordinate of the point having the most plausible combination of unwrapped phase hypotheses as coordinates in the rotated coordinate system, and a is the direction vector $[c/\lambda_1, \ldots, c/\lambda_n]$.

A preferred aspect of the invention concerns a computer program, comprising computer-implementable instructions, which, when executed by a computer, cause the computer to carry out the method described hereinabove.

Another preferred aspect of the invention relates to a time-of-flight distance-measuring device, comprising an electronic control unit with a memory, the memory having stored therein a computer program as described hereinabove, the electronic control unit being configured to execute the computer program when determining a distance.

Yet another preferred aspect of the invention relates to a to a time-of-flight distance-measuring device, comprising an FPGA (field-programmable gate array) or ASIC (application-specific integrated circuit) configured and arranged to carry out the method described hereinabove.

BRIEF DESCRIPTION OF THE DRAWINGS

Preferred, non-limiting, embodiments of the invention will now be described, by way of example, with reference to the accompanying drawings in which.

DETAILED DESCRIPTION OF PREFERRED EMBODIMENTS

Embodiments of the invention are going to be discussed, for illustration purposes, in the context of a 3D TOF camera that delivers, for each of its pixels, a phase information φ in rad which is indicative of the distance d in meters between the camera and the target, and is given by:

$$\varphi = \mathrm{mod}\left(\frac{d \cdot 4\pi \cdot f}{c}, 2\pi\right),$$

where mod is the modulo function (which returns the remainder of the division of the first argument by the second argument), f is the modulation frequency in Hz, and c is the speed of light in m/s. The modulation wavelength λ is given as λ=c/f.

As can be seen, the phase φ repeats itself periodically with the distance, implying that there is a limited unambiguity range of the distance measurement. The unambiguity range is given by:

$$d_u = \frac{c}{2f}.$$

The usable distance measurement range is bounded by the unambiguity range. When performing n measurements with n different frequencies of the same scene, the usable distance measurement range can be extended by combining the results of the different measurements and finding, or estimating in the case of presence of measurement noise, the unknown distance by "inverting" the modulo function.

A first problem that needs to be addressed is how to select the frequency values so as to maximize the allowed measurement noise when a defined usable distance measurement range is required. When sufficient noise is present, the modulo function inversion leads to a distance estimation error.

Figure 1:
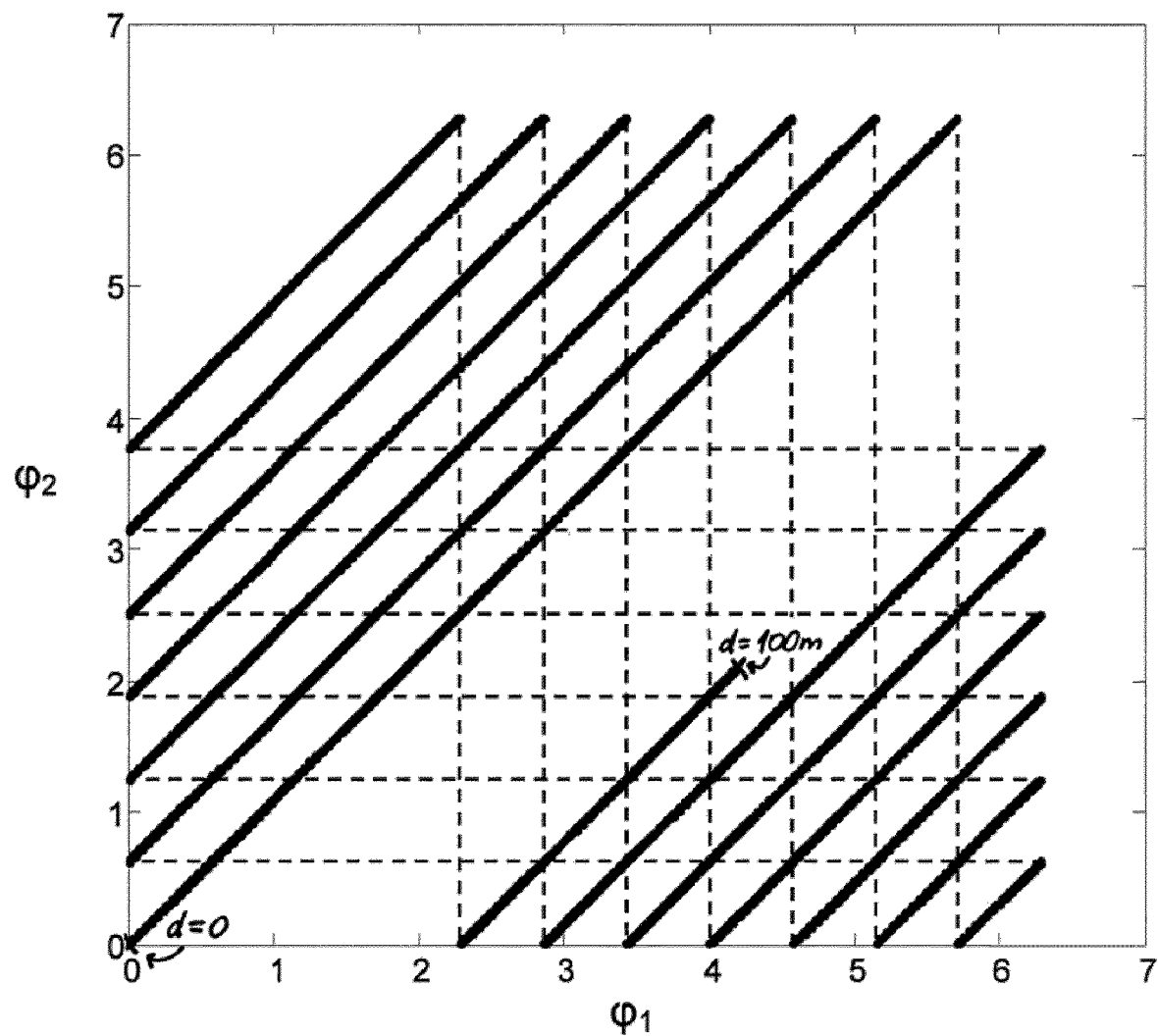
FIG. 1 is a graph illustrating phase couples ($\varphi_1$, $\varphi_2$) obtainable through ideal phase measurements at two different modulation frequencies for distances between 0 and a maximum distance.
Figure 2:
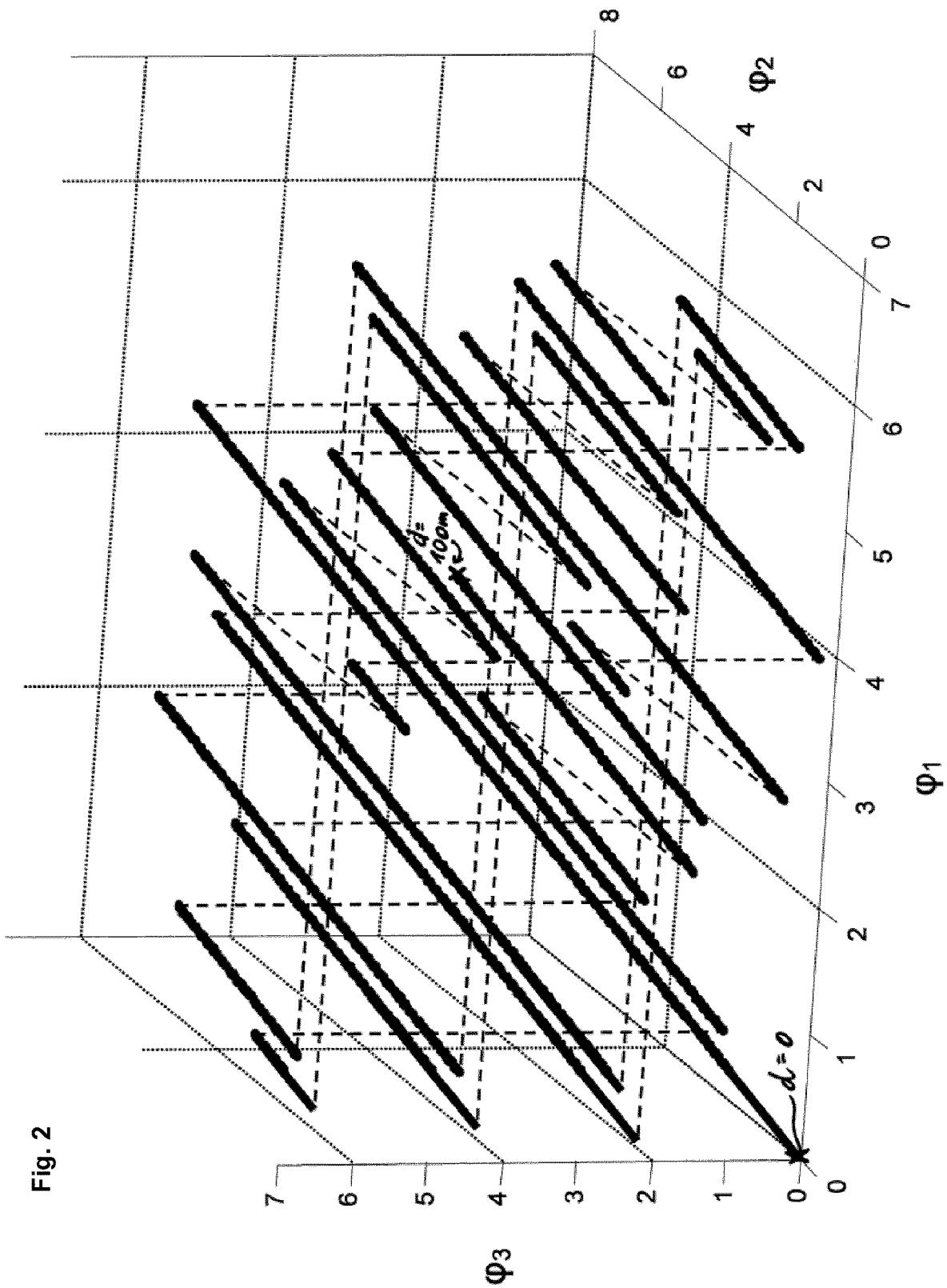
FIG. 2 is a graph illustrating phase triples ($\varphi_1$, $\varphi_2$, $\varphi_3$) obtainable through ideal phase measurements at three different modulation frequencies for distances between 0 and a maximum distance.

To illustrate this problem for a 2-frequency measurement, FIG. 1 shows the relation between ideally measured (i.e. not affected by noise) phases $\varphi_1$ and $\varphi_2$, respectively corresponding to modulation frequencies $f_1$ and $f_2$, when the unknown distance ranges between 0 and the required usable distance measurement range. For FIG. 1, $f_1$ and $f_2$ have been assumed to be 10 MHz and 11 MHz, respectively, and the maximum usable distance measurement range has been set to 100 m. It can be seen that $\varphi_1$ and $\varphi_2$ "wrap around" each time they arrive at $2\pi$ (illustrated by dashed lines). If no noise is present on the measurements, the point $(\varphi_1, \varphi_2)$ defined by the measured phases $\varphi_1$ and $\varphi_2$ lies on one of the line segments shown in FIG. 1. However, if noise is present on the phase measurements, the measured point $(\tilde{\varphi}_1, \tilde{\varphi}_2)$ may differ from the a priori unknown ideal point $(\varphi_1, \varphi_2)$ and be located in the "forbidden areas" between the line segments. If the noise is sufficiently high, the measured point $(\tilde{\varphi}_1, \tilde{\varphi}_2)$ may be closer to a line segment that corresponds to a distance that is completely different from the actual distance. Therefore, the distance between the line segments shown on FIG. 1 must be maximized for a given required usable distance measurement range by appropriately selecting the frequencies $f_1$ and $f_2$. The same applies for an n-frequency measurement. For the illustration of a 3-frequency measurement, FIG. 2 shows a graph similar to the one of FIG. 1 for the frequencies 10 MHz, 11 MHz and 13 MHz. The three frequencies result in a 3D plot.

The maximization of the distances between the line segments may be achieved by a brute force approach. The range in which the modulation frequencies can lie is known beforehand, and is defined for example by the maximum operating frequency of the active illumination and by the minimum frequency which still yields an acceptable imager noise level. Within this range all n frequencies are varied, for example by linearly sweeping or randomly selecting. For each set of n frequencies, (frequency n-tuple), the distance trajectories are drawn in the n-dimensional phase space, and the minimum distance between each possible line segment pair is searched. Finally, the optimal frequency n-tuple that achieves the maximum of the minimum line segment distances is kept and used for the application. The minimum line segment distance value $h_1$ for the optimal frequency n-tuple is also kept and is used in the application to check the confidence level of the measured phase n-tuple.

In the following, the n frequencies are assumed to be known. For illustration purposes, they will be given certain values, but it shall be understood that these frequencies are not necessarily optimal with regard to the above criterion of maximal separation between the line segments.

Figure 3:
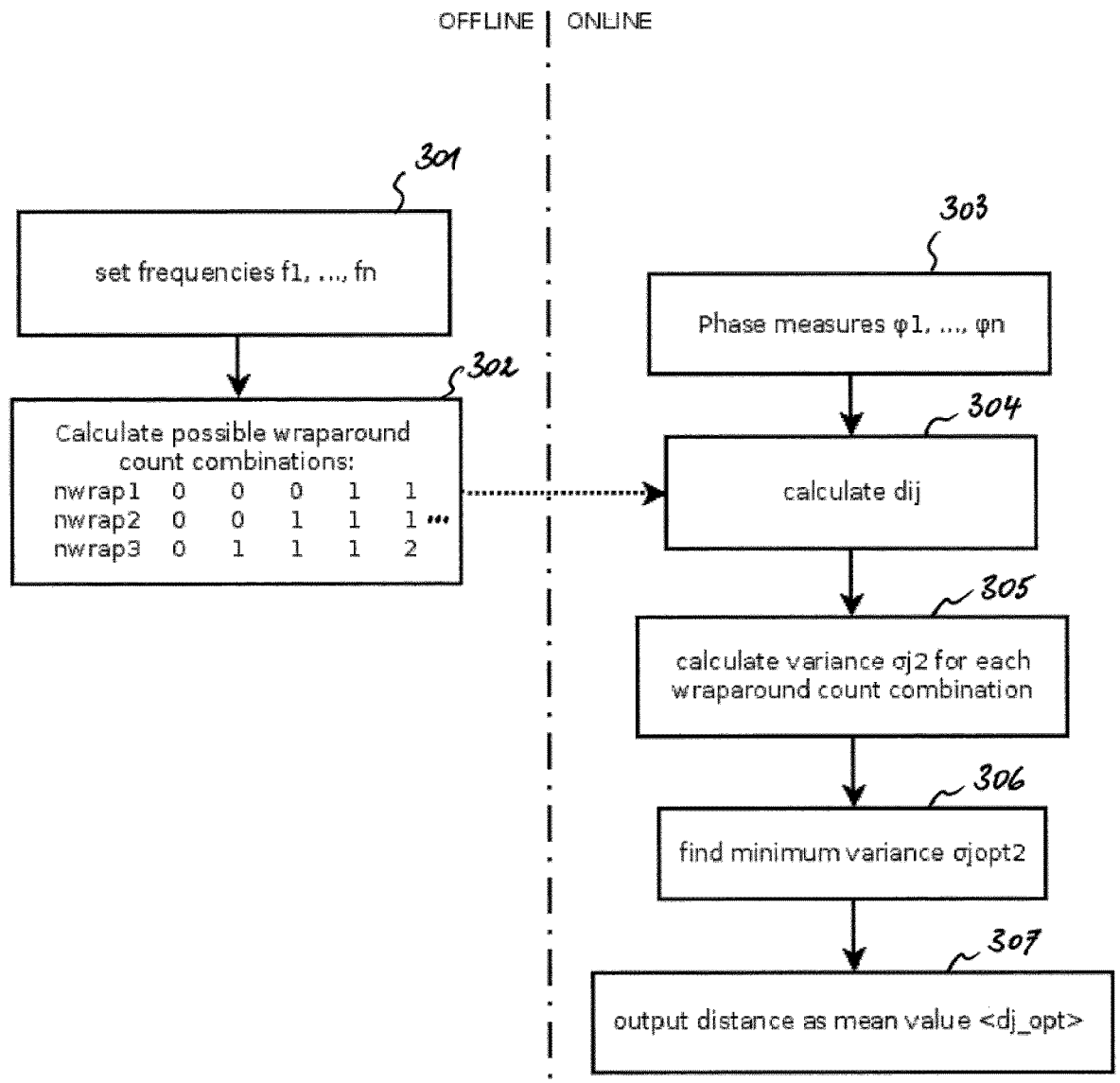
FIG. 3 is a schematic flowchart of a first embodiment of a method for estimating the unknown distance from n phase measurements made at n different frequencies.

A first embodiment of a method for estimating the unknown distance from n phase measurements at n different frequencies will now be described, with reference to FIG. 3. In a first step, the modulation frequencies $f_1, \ldots, f_n$ are fixed (step 301) and for the unknown distance ranging between zero and the usable distance measurement range, a list with all the possibly occurring distinct combinations of phase wraparound counts of each of the n phases is established (step 302). For example, using a 3-frequency measurement with the same parameters as for FIG. 2 (frequencies $f_1$=10 MHz, $f_2$=11 MHz and $f_3$=13 MHz) the following table results:

| nwrap$_1$ | 0 | 0 | 0 | 1 | 1 | 1 | 2 | 2 | 2 | 3 | 3 | 3 | 3 | 4 | 4 | 4 | 5 | 5 | 5 | 6 | 6 | 6 |
|---|---|---|---|---|---|---|---|---|---|---|---|---|---|---|---|---|---|---|---|---|---|---|
| nwrap$_2$ | 0 | 0 | 1 | 1 | 1 | 2 | 2 | 2 | 3 | 3 | 3 | 4 | 4 | 4 | 5 | 5 | 5 | 5 | 6 | 6 | 6 | 7 |
| nwrap$_3$ | 0 | 1 | 1 | 1 | 2 | 2 | 2 | 3 | 3 | 3 | 4 | 4 | 5 | 5 | 5 | 6 | 6 | 7 | 7 | 7 | 8 | 8 | where nwrap$_1$ is the wraparound count of $\varphi_1$ for frequency $f_1$, nwrap$_2$ the wraparound count of $\varphi_2$ for frequency $f_2$ and nwrap$_3$ the wraparound count of $\varphi_3$ for frequency $f_3$. It is worthwhile noting that each column in the above table corresponds to one segment in FIG. 2. The table of phase wraparound counts can be calculated offline, that is to say only once during the configuration of the measurement system, and its results can be permanently stored in the application's non volatile memory, as the only information needed are the n frequencies and the required usable distance measurement range, which are known beforehand.

For each row i and column j in the table, a distance hypothesis may be calculated as:

$$d_{ij} = \frac{(\varphi_i + nwrap_{ij} \cdot 2\pi) \cdot c}{4\pi \cdot f_i}$$

During the measurement, a phase n-tuple $[\varphi_1, \ldots, \varphi_n]$ is measured (step 303). Using the wraparound count table above, a distance hypothesis is estimated for each cell in the table using the above formula for $d_{ij}$ (step 304).

Then, the optimal column $j_{opt}$ in the table is searched for. This column corresponds to the most plausible combination of phase wraparound counts. According to the first embodiment of the method, the optimal column is the one for which the variance or the standard deviation of the n distances $d_{ij}$ in the column is minimal. The variance $\sigma_j^2$ of each wraparound count combination j may be calculated (step 305) as:

$$\sigma_j^2 = \frac{1}{n}\sum_{i=1}^{n} d_{ij}^2 - \frac{1}{n}\sum_{i=1}^{n} d_{ij}$$

and the minimum variance be determined (step 306).

The ratio of the standard deviation (found for j_opt) to the minimum line segment distance $h_1$ can be used as an indicator of the confidence level of the distance measurement (the smaller the ratio the better).

Finally, the mean (average)

$$\langle d_{j\_opt} \rangle = \frac{1}{n}\sum_{i=1}^{n} d_{ij\_opt}$$

of the distances $d_{ij\_opt}$ of the column j_opt serves as an estimation of the unknown distance (step 307).

Figure 4:
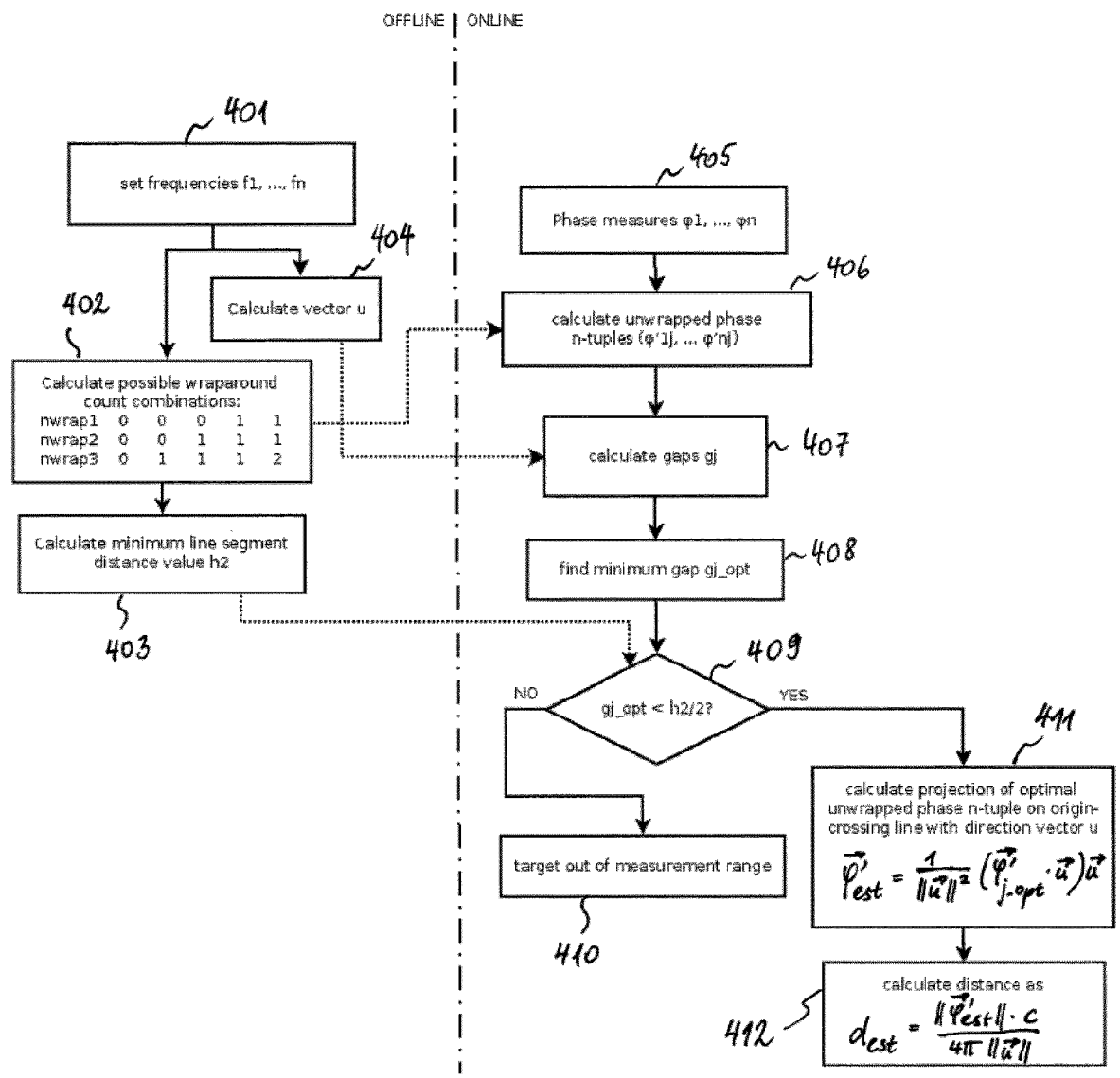
FIG. 4 is a schematic flowchart of a second embodiment of a method for estimating the unknown distance from n phase measurements made at n different frequencies.

A second embodiment of the method for estimating the unknown distance from n phase measurements at n different frequencies will now be described with reference to FIG. 4. This embodiment takes advantage from the fact that the actual required distance measurement range is typically smaller than the target detection range from which no folding back into the required distance measurement range must occur, but where the actual target distance does not need to be measured. In many application it is necessary only that the TOF measurement device is able to measure the unknown distance over a restricted range. Targets beyond this range and still within the range where the TOF measurement device detects a target must not fold back into the required distance measurement range, but their distance does not need to be known. For example, in an automotive 'advanced driver assistance system', only the distances to targets which are within, e.g. 20 m in front of the car shall be measured, but at the same time highly reflective targets up to 100 m in front of the car must not be folded back into the required distance measurement range. For this example, the detection range is 100 m, but the required distance measurement range is only 20 m. This implies that the frequency selection process (step 401) takes into account 1) the distances between any two line segments representing distances within the required measurement range,
2) the distances between any pair of one line segment representing a distance within the required measurement range and one line segment representing a distance that is outside the required measurement range but still within the equipment's detection range but does not take into account the distances between any two line segments representing distances, which are outside the required measurement range but still within the equipment's detection range. The minimum line segment distance value (hereinafter noted $h_2$) that is found (step 403) is kept and used in the application to check the confidence level of the measured phase n-tuple.

For the unknown distance ranging between zero and the required measurement range, a list with all the possibly occurring distinct combinations of phase wraparound counts of each of the n phases is established. For example, using 3-frequency measurement with the same parameters as for FIG. 2 and a wanted measurement range of 20 m, the following table results:

| nwrap$_1$ | 0 | 0 | 0 | 1 | 1 |
| nwrap$_2$ | 0 | 0 | 1 | 1 | 1 |
| nwrap$_3$ | 0 | 1 | 1 | 1 | 2 | where nwrap$_1$ is again the wraparound count of $\varphi_1$ for frequency $f_1$, nwrap$_2$ the wraparound count of $\varphi_2$ for frequency $f_2$ and nwrap$_3$ the wraparound count of $\varphi_3$ for frequency $f_3$. The set of frequencies and the table of wraparound count can be calculated offline (steps 401 and 402), that is only once during the configuration of the measurement system and its results can be permanently stored in the application's non volatile memory, as the only information needed are the n frequencies, the wanted measurement range and the required extended unambiguity distance, which are known beforehand.

Using the wraparound count table above, the column which best unwraps the n-tuple of measured phases [($\varphi_1$, ..., $\varphi_n$], leading to an optimal estimation of the unknown distance, is searched for.

The online calculation starts with the providing of the phase measurements (step 405), which may be represented as phase n-tuple [$\varphi_1$, ..., $\varphi_n$] or vector $\vec{\varphi}$. For each row i and column j in the list and for a combination of measured phases (n-tuple [($\varphi_1$, ..., $\varphi_n$]), the unwrapped phase is calculated (step 406) using the formula:

$$\varphi'_{ij} = +n\text{wrap}_{ij} \cdot 2\pi.$$

Then, for each column j, the gap $g_j$ in the n-dimensional phase space between the unwrapped phase n-tuple [$\varphi'_{ij}$, ... $\varphi'_{nj}$] and the origin-crossing straight line having the direction vector $$\vec{u} = [f_1, \ldots, f_n] = [c/\lambda_1, \ldots, c/\lambda_n]$$

is calculated (step 407). This can for example be done by calculating the length of the vector cross product of the unwrapped phase n-tuple [($\varphi'_{1j}$, ..., $\varphi'_{nj}$], which we will designate by $\vec{\varphi}'_j$ for simplicity, and the normalized vector $\vec{u}$:

$$g_j = \left\| \vec{\varphi}'_j \times \frac{\vec{u}}{\|\vec{u}\|} \right\|$$

where x designated the vector cross product and ∥.∥ the length of vector a vector. It is worthwhile noting that the vector a is preferably determined beforehand (step 404).

Then, the smallest $g_j$ (hereinafter denoted $g_{j\_opt}$) is searched among all the $g_j$, (step 408) and then the unwrapped phase n-tuple $\vec{\varphi}'_{j\_opt} = [\varphi'_{1j\_opt}, \ldots, \varphi'_{nj\_opt}]$ corresponding to $g_{j\_opt}$ is selected.

$g_{j\_opt}$ is compared (step 409) with $h_2/2$ found in the frequency selection process described above. If $g_{j\_opt} < h_2/2$, then the distance to be determined lies within the required measurement range, if $g_{j\_opt} \geq h_2/2$, then it lies outside the required measurement range (but within the detection range, for otherwise there would be no phase measurement values) and is not considered a valid distance (step 410).

Preferably, the squares of the $g_j$ are computed instead because doing this is computationally less expensive. $g_{j\_opt}^2$ is then compared with the offline computed parameter $h_2^2/4$.

The unknown distance $d_{est}$ is finally computed by projecting the found unwrapped phase n-tuple $\vec{\varphi}'_{j\_opt} = [\varphi'_{1j\_opt}, \ldots, \varphi'_{nj\_opt}]$ onto the origin-crossing line with direction vector $\vec{u}$ (step 411), measuring the distance of the projection to the origin.

Noting $$\vec{\varphi}'_{est} = \frac{1}{\|\vec{u}\|^2} (\vec{\varphi}'_{j\_opt} \cdot \vec{u}) \vec{u}$$

the projection of the found unwrapped phase n-tuple $\vec{\varphi}'_{j\_opt} = [\varphi'_{1j\_opt}, \ldots, \varphi'_{nj\_opt}]$ onto the origin-crossing line with direction vector $\vec{u}$ ("•" designated the dot product between two vectors), the distance can be estimated (step 412) as:

$$d_{est} = \frac{\|\vec{\varphi}'_{est}\| \cdot c}{4\pi \cdot \|\vec{u}\|}.$$

Figure 5:
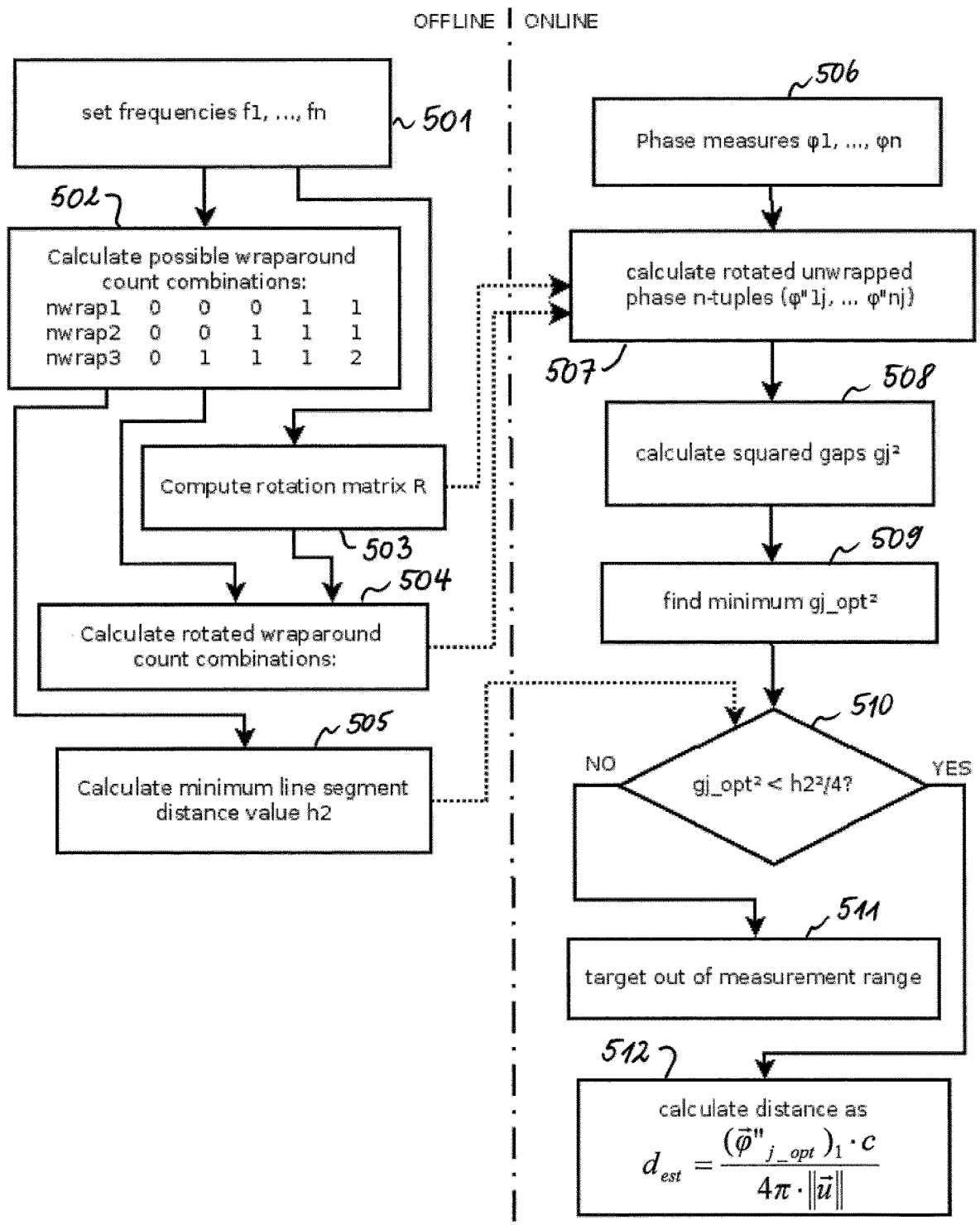
FIG. 5 is a schematic flowchart of a third embodiment of a method for estimating the unknown distance from n phase measurements made at n different frequencies.

A preferred implementation of the second embodiment, which is computationally inexpensive will now be explained with reference to FIG. 5. This implementation is similar to the implementation of FIG. 4, except that the n-dimensional phase space is rotated around the origin in such a way that the vector $\vec{u}=[f_1, f_2, f_3]$ will be rotated into alignment with the x-axis unit vector $\vec{i}=[1,0,0]$. The y and z-axis unit vectors would allow the same inexpensive implementation, but for the sake of simplicity only the case for the x axis unit vector will be described. There is a virtually infinite number of ways to achieve this transformation, and for simplicity the rotation will be performed around the unity-length normal vector $\vec{n}$ of the plane spanned by $\vec{u}$ and $\vec{i}$, and the angle of rotation will be the angle $\alpha$ between $\vec{u}$ and $\vec{i}$:

With $\vec{v}=\vec{u}/\|\vec{u}\|$, $\vec{n}$ may be expressed as:

$$\vec{n} = \frac{\vec{v} \times \vec{i}}{\|\vec{v} \times \vec{i}\|}.$$

The angle can be calculated as: $\alpha=\arccos(\vec{v} \cdot \vec{i})$.

The rotation matrix R, which performs the rotation operation described above is defined by:

$$R = \begin{pmatrix} n_1 n_1(1-\cos\alpha)+\cos\alpha & n_2 n_1(1-\cos\alpha)-n_3\sin\alpha & n_3 n_1(1-\cos\alpha)+n_2\sin\alpha \\ n_1 n_2(1-\cos\alpha)+n_3\sin\alpha & n_2 n_2(1-\cos\alpha)+\cos\alpha & n_3 n_2(1-\cos\alpha)+n_1\sin\alpha \\ n_1 n_3(1-\cos\alpha)-n_2\sin\alpha & n_2 n_3(1-\cos\alpha)+n_1\sin\alpha & n_3 n_3(1-\cos\alpha)+\cos\alpha \end{pmatrix},$$

with $\vec{n}=(n_1, n_2, n_3)$.

The offline computation comprises the selection of the modulation frequencies (step 501), the calculation of the wraparound count table (step 502) and the calculation of the rotation matrix R (step 503), as indicated above, and the calculation of the parameter $h_2$ (step 505).

The online calculation begins with providing the n phase measurements (step 506). Instead of calculating, for each column j, the gap $g_j$ in the n-dimensional phase space between the unwrapped phase n-tuple $(\varphi'_{1j}, \ldots, \varphi'_{nj})$ and the origin-crossing straight line having the direction vector $\vec{u}=[f_1, \ldots, f_n]$, in this implementation, one calculates, for each column j, the gap $g'_j$ between the rotated unwrapped phase n-tuple $R[\varphi'_{1j}, \ldots \varphi'_{nj}]=R\vec{\varphi}'_j$ and the x-axis (i.e. the rotated origin-crossing straight line having $\vec{u}=[f_1, \ldots, f_n]$ as direction vector). Since the rotation does not change the measures, $g'_j=g_j$.

The rotated unwrapped phase n-tuple $\vec{\varphi}''_j$ may be calculated (step 507) as:

$$\vec{\varphi}''_j = R\vec{\varphi}'_j = R\vec{\varphi}_j + R\overrightarrow{nwrap_j} \cdot 2\pi,$$

Where $\overrightarrow{nwrap_j}$ is the j-th column vector of the phase wraparound table. It is worthwhile noting that $R\overrightarrow{nwrap_j} \cdot 2\pi$ can be calculate upfront (as step 504 of the offline calculations), which means that this calculation does not take any processing time in the online calculations.

It shall also be noted that the gap $g_j$ depends only on the second and third coordinates of $\vec{\varphi}''_j$, which we denote by $(\vec{\varphi}''_j)_2$ and $(\vec{\varphi}''_j)_3$. For the square of the gap $g_j$, the following equation holds:

$$g_j^2 = (\vec{\varphi}''_j)_2^2 + (\vec{\varphi}''_j)_3^2.$$

The smallest gap is searched for among all the $g_j$. The smallest gap found, $g_{j\_opt}$, is compared with $h_2/2$ found in the offline frequency selection process. If $g_{j\_opt}<h_2/2$, then the distance to be determined lies within the required measurement range, if $t_{j\_opt} \geq h_2/2$, then it lies outside the required measurement range (but within the detection range, for otherwise there would be no phase measurement values) and is not considered a valid distance. It is possible to compute only the squares of the $g_j$ (step 508). In this case, the smallest squared gap is searched for among all the $g_j^2$ (step 509), and the value found, $g_{j\_opt}^2$, is compared with the offline computed parameter $h_2^2/4$ (step 510). If $g_{j\_opt}^2 \geq (h_2/2)^2$, the rotated unwrapped phase n-tuple $\vec{\varphi}''_{j\_opt}$ is considered to represent the most plausible combination of unwrapped phase hypotheses, otherwise the target is considered to lie outside the measurement range (step 511).

The unknown distance $d_{est}$ is computed by orthogonally projecting the rotated unwrapped phase n-tuple $\vec{\varphi}''_{j\_opt}$ onto the x-axis (i.e. the rotated origin-crossing line with direction vector $\vec{u}$). Noting $(\vec{\varphi}''_{j\_opt})_1$ the first coordinate of $\vec{\varphi}''_{j\_opt}$, the projected point has $((\vec{\varphi}''_{j\_opt})_1, 0, 0)$ as coordinates.

The distance can finally be estimated (step 512) as:

$$d_{est} = \frac{(\vec{\varphi}''_{j\_opt})_1 \cdot c}{4\pi \cdot \|\vec{u}\|}.$$

The difference between the computational efforts for the first implementation of the method described above, the second implementation and the computationally inexpensive version described above is now illustrated by means of an example. Only the online computation effort is estimated, since the offline computations do not consume any processing time during the measurements. Only the multiplications and square root operations are counted as they are the most expensive to implement.

When using the first implementation and using the parameters given as example, an initial scaling of $[\varphi_1, \varphi_2, \varphi_3]$ in order to reduce the computational effort in calculating the distance hypotheses $d_{ij}$ requires 3 scalar multiplications for each column in the wraparound list (there are 22 columns in the example), one multiplication for the computation of the mean value, 3 multiplications for the variance (easier to compute than the standard deviation but fulfils the same purpose), and for the calculation of the final result (distance) one scalar multiplication, resulting in: 3+22*(1+3)+1=92 multiplications and no square root operation.

When using the second method described above and using the parameters given as example, for each column in the wraparound list (there are 5 columns), a vector cross product (6 multiplications), a vector squared length calculation (3 multiplications), and for the final result, a vector dot product (3 multiplications), a vector scalar product (3 multiplications), a vector length calculation (3 multiplications and a square root) and a scalar multiplication are required, resulting in: 5*(6+3)+3+3+3+1=55 multiplications and one square root operation.

When using the computationally inexpensive version described above and using the parameters given as example, the initial rotation requires 9 multiplications, for each column in the wraparound list (there are 5 columns), a 2-dimensional vector squared length calculation (2 multiplications), and for the final result, a scalar multiplication are required, resulting in: 9+5*2+1=20 multiplications and no square root operation.

In the above-disclosed distance estimation methods the actual value of the measurement phase noise is preferably known or estimated during the measurement. Indeed, if the phase noise is too large, it may happen that the noisy unknown distance n-tuple in the n-phase space jumps from the vicinity of the line segment, which the actual unknown distance phase n-tuple belongs to, into the vicinity of a completely different line segment in the phase space. Eventually, this leads to wrong distance estimation. Therefore, measurements, which have too large phase noise, are preferably declared invalid. The phase noise can be estimated or measured by measuring the amplitude, or by measuring the amplitude and intensity of the received modulated light and combing the amplitude and intensity. How this can be done is, for example, described in '3D Time-of-Flight Distance Measurement with Custom Solid-State Image Sensors in CMOS/CCD-Technology' by R. Lange.

Figure 6:
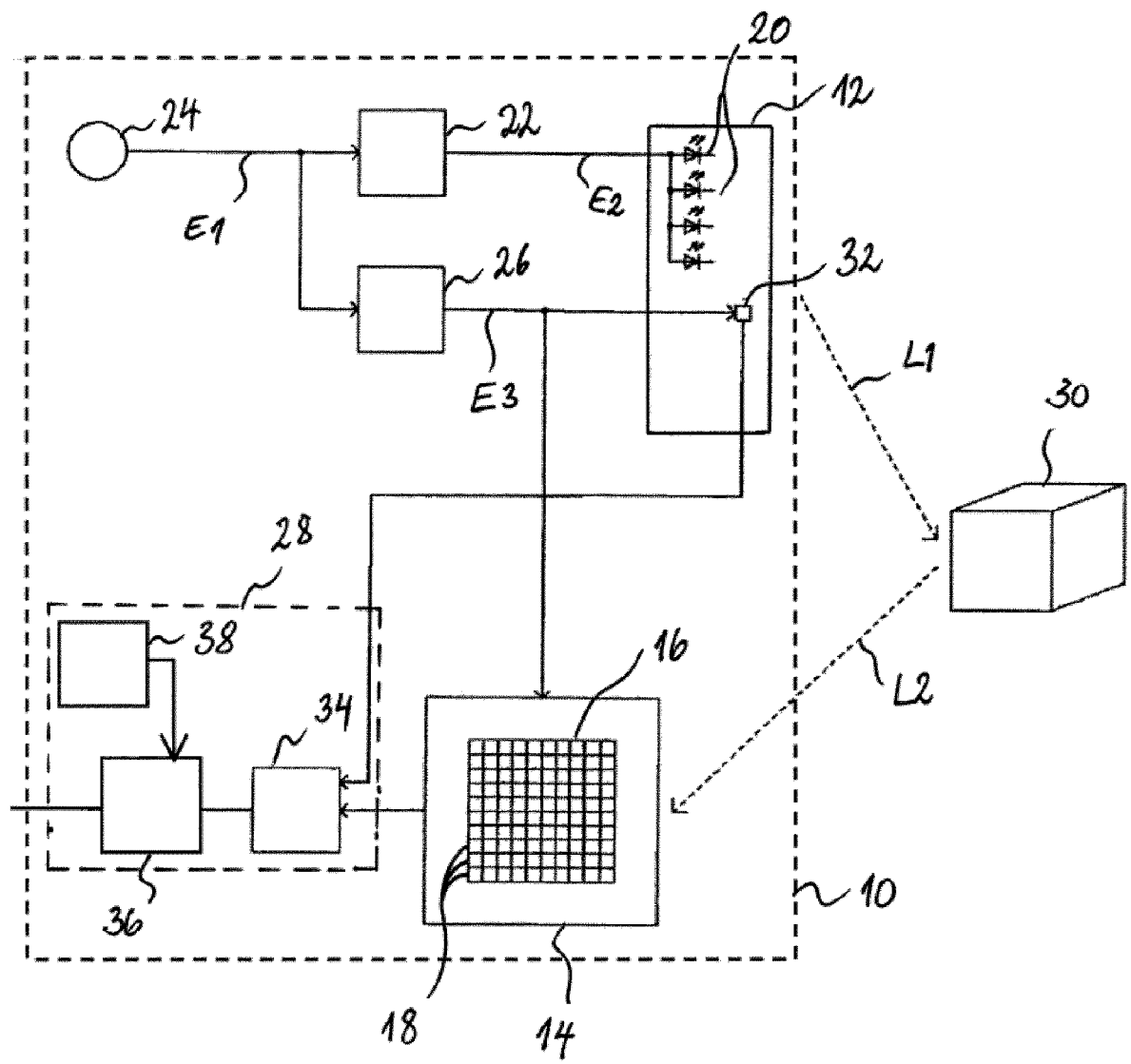
FIG. 6 is a schematic illustration of a preferred embodiment of a 3D-TOF camera

FIG. 6 shows a preferred embodiment of a 3D TOF camera, generally identified by reference numeral 10. The 3D TOF camera 10 comprises an illumination unit 12 emitting light onto a scene, and an imaging sensor 14 imaging the scene. The imaging sensor 14 comprises, in a manner known per se, the required optical accessories such as a focusing lens (not shown) and an electronic camera chip 16 executed in any suitable technology, such as CCD, CMOS, TFA or the like. The imaging sensor 14 comprises a two-dimensional array of individual lock-in pixel sensor cells 18, each of which receives light from a small portion of the scene to be imaged for creating a pixel-by-pixel image thereof.

The illumination unit 12 comprises several individual light emitting devices 20 such as light emitting diodes (LEDs), which are collectively driven by means of an illumination driver 22. A signal source 24 provides the input signals for the illumination driver 22 and a photo gate driver 26. The output of the photo gate driver 26 is connected to the imaging sensor 14. An evaluation unit 28 comprising a suitable electronic calculation device, e.g. a digital signal processor (DSP), is connected to the output of the imaging sensor 14.

When operating, the signal source 24 generates a modulation signal E1 on its output and feeds this modulation signal E1 to the illumination driver 22. The latter drives the illumination unit 12 with a drive signal E2 to emit an intensity-modulated light signal L1 into a target scene comprising an object 30 (for illustration purposes). The modulated light signal L1 is partially reflected by the object 30 so as to form a returning light signal L2 which is received as incident light by the imaging sensor 14. The modulation signal E1 is also fed to the photo gate driver 26, which provides a demodulation signal E3. The imaging sensor 14 receives this demodulation signal E3 and produces a phase information signal E4, which is fed to the evaluation unit 28. The signal source 24 cycles through the plurality of different modulation frequencies $f_1, \ldots, f_n$.

The 3D TOF camera 10 further comprises a reference pixel 32 mounted in the illumination unit 12 contiguous to the light emitting devices 20 in such a way that it gathers light from the light emitting devices 18. The reference pixel 32 produces an output signal E5, which corresponds essentially to a modulation phase reference (comparable to a "zero" distance measurement). A reference subtraction stage 34 within the evaluation unit 28, outputs, for each pixel, phase information 9, in rad corresponding to the modulation frequency $f_i$. The distance information for each camera pixel 18 is then calculated in a distance calculation stage 36, in accordance with the method of the present invention. The evaluation unit 28 comprises a non-volatile memory 38, in which the calibration data, in particular the parameters that may be calculated offline, are stored. The distance calculation stage 36 has access to these parameters for executing the method.

It is worthwhile noting that in an actual implementation of the evaluation unit 28, the phase subtraction stage 34 and the distance calculation stage 36 are not necessarily physically separate components. The different operations may, in particular, be carried out by a single (multi-purpose) processor.

While specific embodiments have been described in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A method for determining a distance between a time-of-flight (TOF) measuring device and a target, wherein the time-of-flight measuring device is configured to generate a range image of the target and includes an illumination unit, an imaging sensor, and an evaluation unit coupled with a non-transitory memory, the method comprising:

defining a usable distance measurement range within which the TOF measuring device determines a distance to the target;

generating a table containing all possible wraparound count combinations for phase measurements at different modulation frequencies, wherein the table is stored in the non-transitory memory as part of the TOF measuring device configuration;

emitting light from the illumination unit into a direction of the target, wherein the light is modulated at different modulation wavelengths;

receiving at the imaging sensor the modulated light reflected from the target and generating a phase information signal based on the reflected light at the different modulation wavelengths;

using the evaluation unit, determining for each pixel of the imaging sensor, phase measurements based on the phase information signal received from the imaging sensor, wherein each phase measurement is indicative of the distance up to an integer multiple of a respective modulation wavelength;

using the evaluation unit, for each one of the possible wraparound count combinations in the table, determining a combination of unwrapped phase hypotheses based on the phase measurements;

using the evaluation unit, determining a most plausible combination of unwrapped phase hypotheses among the combinations of unwrapped phase hypotheses by calculating, for each combination of unwrapped phase hypotheses, a gap between a point having the respective unwrapped phase hypotheses as coordinates and an origin-crossing straight line having a direction vector with coordinate representation [c/λ$_1$, ..., c/λ$_n$], where λ$_1$, ..., λ$_n$ designate the different modulation wavelengths and c designates the speed of light, and selecting as the most plausible combination of unwrapped phase hypotheses the one for which the gap is smallest;

calculating the distance to the target for each pixel of the image sensor based on the selected most plausible combination of unwrapped phase hypotheses; and generating a range image of the target using the distance calculated for each pixel.

2. The method as claimed in claim 1, wherein the distance is determined as $$\frac{\|\vec{\varphi}'_{est}\| \cdot c}{4\pi \cdot \|\vec{u}\|},$$

where $\vec{\varphi}'_{est}$ is an orthogonal projection onto the origin-crossing straight line of a point having the most plausible combination of unwrapped phase hypotheses as coordinates, and it is the direction vector [c/λ$_1$, ..., c/λ$_n$].

3. The method as claimed in claim 1, wherein the determining of the gap is carried out in a rotated coordinate system, in which the origin-crossing straight line is a coordinate axis.

4. The method as claimed in claim 3, wherein the distance is determined as $$\frac{(\vec{\varphi}''_{j\_opt})_1 \cdot c}{4\pi \cdot \|\vec{u}\|}$$

where $(\vec{\varphi}''_{j\_opt})_1$ is a coordinate of said point having the most plausible combination of unwrapped phase hypotheses as coordinates in the rotated coordinate system, and $\vec{u}$ is the direction vector [c/λ$_1$, ..., c/λ$_n$].

5. A computer program product, stored on a non-transitory computer readable medium, the computer program product comprising computer-implementable instructions, which, when executed by a processing unit, cause the processing unit to carry out the method as claimed in claim 1.

6. Time-of-flight distance measuring device, comprising:
an electronic control unit coupled to a memory,
the memory having stored therein a computer program as claimed in claim 5,
the electronic control unit being configured to execute the computer program when determining a distance,
wherein the electronic control unit is the processing unit.

7. Time-of-flight distance measuring device, comprising:
an electronic control unit with an FPGA and/or an ASIC, said FPGA and/or ASIC configured and arranged to carry out the method as claimed in claim 1.

8. The method as claimed in claim 1, wherein the usable distance measurement range is less than a target detection range of the TOF measuring device.

9. The method as claimed in claim 1, further comprising determining whether the distance is a valid distance that lies within the usable distance measurement range based on a comparison of the smallest gap to a minimum line segment distance value.

* * * * *